(12) United States Patent
Katsoulis et al.

(10) Patent No.: US 7,682,545 B2
(45) Date of Patent: Mar. 23, 2010

(54) EMBOSSING TOUGHENED SILICONE RESIN SUBSTRATES

(75) Inventors: Dimitris Katsoulis, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 919 days.

(21) Appl. No.: 10/577,377

(22) PCT Filed: Oct. 22, 2004

(86) PCT No.: PCT/US2004/035078

§ 371 (c)(1),
(2), (4) Date: Apr. 28, 2006

(87) PCT Pub. No.: WO2005/051636

PCT Pub. Date: Jun. 9, 2005

(65) Prior Publication Data

US 2007/0098958 A1    May 3, 2007

Related U.S. Application Data

(60) Provisional application No. 60/520,599, filed on Nov. 17, 2003.

(51) Int. Cl.
*B28B 3/00* (2006.01)
(52) U.S. Cl. ............... 264/293; 264/299; 264/284; 264/239
(58) Field of Classification Search ............... 264/500, 264/239, 266, 284, 299, 293, 319–320
See application file for complete search history.

(56) References Cited

U.S. PATENT DOCUMENTS

| 3,419,593 | A | 12/1968 | Willing |
| 3,951,060 | A * | 4/1976 | Crystal ............... 101/150 |
| 5,747,608 | A | 5/1998 | Katsoulis et al. |
| 5,830,950 | A | 11/1998 | Katsoulis et al. |
| 6,310,146 | B1 | 10/2001 | Katsoulis et al. |
| 2002/0025408 | A1 * | 2/2002 | Davis ............... 428/141 |

(Continued)

OTHER PUBLICATIONS

JP 11-059094, Published Mar. 2, 1999, Patent Abstracts of Japan.

(Continued)

*Primary Examiner*—Khanh Nguyen
*Assistant Examiner*—Saeed M Huda
(74) *Attorney, Agent, or Firm*—Timothy J. Troy

(57) ABSTRACT

This invention relates to a method of embossing a cured silicone resin thermoset substrate to imprint patterns onto the substrate from a master mold comprising (i) stacking a master mold with a cured silicone resin thermoset substrate such that the surface of the master mold containing a feature is facing the silicone resin substrate; (ii) applying pressure to the product of (i) in a press at a temperature slightly higher than the Tg of the silicone resin but lower than the softening point of the master mold; (iii) cooling the product of (ii) and maintaining the pressure on the mold; and (iv) releasing the substrate whereby the feature is imprinted on the silicone resin substrate. Cured silicone resin thermoset substrates offer advantages over the organic thermoplastics in terms of hot embossing lithography by offering a very smooth surface which promotes high fidelity of replication in the micrometer and manometer domain, and requiring no release agent for demolding.

16 Claims, 2 Drawing Sheets

U.S. PATENT DOCUMENTS

2003/0143938 A1* 7/2003 Braunschweig et al. ..... 451/533
2004/0086728 A1* 5/2004 Maruoka et al. ............ 428/447

OTHER PUBLICATIONS

JP 06-210740, Published Aug. 2, 1994, Patent Abstracts of Japan.
JP 05-338091, Published Dec. 21, 1993, Patent Abstracts of Japan.
American Vacuum Society, "Embossing of polymers using a thermosetting polymer mold made by soft lithography," Rubo Xing, Zhe Wange and Yanchun Han, Jul./Aug. 2003, p. 1318-1322.
Optical Fiber and Planar Waveguide Technology II, "High Performance Polymer Waveguide Devices via Low Cost Direct Photolithography Process," J.Wang, P.Shustack, S.Garner, vol. 4904, 2002, p. 129-138.
The Royal Society of Chemistry, "Microfulidic devices fabricated in poly(methyl methacrylate) using hot-embossing . . . ", S. Qi, et. al., Lab Chip 2002, vol. 2, p. 88-95.
Lithographic and Micromaching Techniques . . . , "Fabrication of Diffractive Opitcal Elements on Si Chip by an Imprint Lithography using Non-Symmetrical Silicon Mold," Hirai, et. al., vol. 4440, 2001, p. 228-237.
Emerging Lithographic Technologies VI, "Performance of 4" Wafer-Scale Thermoset Working Stamps in Hot Embossing Lithography, Roose, et. al., vol. 4688, 2002, p. 232-239.
Microelectronic Engineering, "Chemical nano-patterning using hot embossing lithography," H. Schift, et. al., vol. 61-62, 2002, p. 423-428.

* cited by examiner

EMBOSSING TOUGHENED SILICONE RESIN SUBSTRATES

CROSS REFERENCE TO RELATED APPLICATIONS

This application is a U.S. national stage filing under 35 U.S.C. §371 of PCT Application No. PCT/US2004/35078 filed on Oct. 22, 2004, currently pending, which claims the benefit of U.S. Provisional Patent Application No. 60/520,599 filed Nov. 17, 2003 under 35 U.S.C. §119 (e). PCT Application No. PCT/US2004/35078 and U.S. Provisional Patent Application No. 60/520,599 are hereby incorporated by reference.

Embossing the surface of an article or a substrate is an important and easy to apply process that imparts patterns onto the surface. The patterns imprinted onto the surface either make the article more visually appealing, or add functionality onto the surface such as increased friction.

Hot embossing is essentially the stamping of a pattern into a polymer softened by raising the temperature of the polymer just above its glass transition temperature. A wide variety of thermoplastic polymers have been successfully hot embossed with micron-scale and below size features, including polycarbonate and PMMA. This technique is used primarily for defining micro-channels and wells for fluidic devices. The benefits of this approach are the ability to take advantage of the wide range of properties of polymers, as well as the potential to economically mass produce parts with micron-scale features. Although thermoplastic polymers have been used as substrates in embossing applications, cured thermosets have not been used although thermoset polymers have been proposed as master molds.

Embossing of polymers using a thermosetting polymer mold made by soft lithography have been disclosed by Xing, Rubo; Wang, Zhe; Han, Yanchun, Changchun Institute of Applied Chemistry, State Key Laboratory of Polymer Physics and Chemistry, Chinese Academy of Sciences, Changchun, Peoples Republic of China, Journal of Vacuum Science & Technology, B: Microelectronics and Nanometer Structures (2003), 21(4), 1318-1322.

Performance of wafer-scale thermoset working stamps in hot embossing lithography have also been disclosed by Roos, Nils; Schulz, Hubert; Fink, Marion; Pfeiffer, Karl; Osenberg, Frank; Scheer, Hella-Christin, Univ. of Wuppertal, Wuppertal, Germany. *Proceedings of SPIE—The International Society for Optical Engineering* (2002), 4688(Pt. 1, Emerging Lithographic Technologies VI), 232-239.

Silicone resins are most often disclosed as being used as a releasing layer for an embossing process. In Japanese Patent No. 11059094 is disclosed the application of uncured resins including silicones on a substrate, passing between an embossing roll and a flat surface roll, solidifying the resin, and removing the substrate.

In Japanese Patent No. 06210740 is disclosed using a thermosetting silicone compound as a coating on a thermoplastic film, and the resulting product is then used in a hot embossing process.

In Japanese Patent No. 05338091 radiation curable resins are disclosed, including silicone resins, which form a coated layer on a substrate, which then is subjected to the embossing process.

Thus the art has disclosed using uncured silicone resins in the embossing process. However, nowhere in the art is disclosed using a cured silicone resin in the embossing process. Embossing an uncured silicone resin necessitates the use of heat or radiation to cure it, and a substrate to support the resin before it is cured. An added step to apply the resin is also necessary. If a cured silicone resin can be embossed, the process is simplified. Furthermore, if the silicone resin is in the form of a free standing film or plaque, and not in the form of a release coating, the other advantages of silicone resins such as radiation and heat resistance can be fully utilized.

Recently embossing has shown to be a useful technique to transfer surface patterns with micrometer features, which can be used to fabricate microfluidic devices and microelectronic circuits. In those cases the ability of silicone polymers to release easily and cleanly makes them truly outstanding as compared with other polymers.

Wang et al. have disclosed the use of fluorinated maleimide copolymers with glycidyl methacrylate as substrates for hot micro embossing and E-beam lithography to fabricate channel waveguides and other microstructures (Wang, Jianguo; Shustack, Paul J.; Garner, Sean M., Science Technology Division, Corning Inc., Corning, N.Y., USA, Proceedings of SPIE—The International Society for Optical Engineering (2002), 4904(Optical Fiber and Planar Waveguide Technology II), pp 129-138).

Schift et al. disclosed nano-patterning of silanes on silicon substrates using hot embossing and lift-off (Schift, H.; Heyderman, L. J.; Padeste, C.; Gobrecht, J., Laboratory for Micro- and Nanotechnology, Paul Scherrer Institute, Villigen, Switzerland, Microelectronic Engineering (2002), pp. 61-62, 423-428).

Qi et al have disclosed hot-embossing of polymethylmethacrylate from nickel-based molding dies (Qi, Shize; Liu, Xuezhu; Ford, Sean; Barrows, James; Thomas, Gloria; Kelly, Kevin; McCandless, Andrew; Lian, Kun; Goettert, Jost; Soper, Steven A., Department of Chemistry, Louisiana State University, Baton Rouge, La., USA., Lab on a Chip (2002), pp. 2(2), 88-95).

Similarly, Hirai et al have disclosed the use of a silicon mold to transfer a fine diffractive optical pattern to a thin PMMA layer on a silicon chip (Hirai, Yoshihiko; Okano, Masato; Okuno, Takayuki; Toyota, Hiroshi; Yotsuya, Tsutomu; Kikuta, Hisao; Tanaka, Yoshio. Mechanical Systems Engineering, Graduate School of Osaka Prefecture University, Japan, Proceedings of SPIE—The International Society for Optical Engineering (2001), 4440 (Lithographic and Micromachining Techniques for Optical Component Fabrication), pp. 228-237).

This invention relates to a method of embossing a cured silicone resin thermoset substrate to imprint patterns onto the substrate from a master mold comprising (i) stacking a master mold with a cured silicone resin thermoset substrate such that the surface of the master mold containing a feature is facing the silicone resin substrate; (ii) applying pressure to the product of (i) in a press at a temperature slightly higher than the Tg of the silicone resin but lower than the softening point of the master mold; (iii) cooling the product of (ii) and maintaining the pressure on the mold; and (iv) releasing the substrate whereby the feature is imprinted on the silicone resin substrate.

The substrate can be in the form of a film, plaque, or coating. The toughened silicone resin thermoset substrates have moderate glass transition temperatures from above room temperature to slightly above 100° C., typically between 50° C. to 80° C.

The method involves pressing together the master mold and the toughened silicone resin substrate for a predetermined amount of time while heating the system at a temperature slightly above the glass transition of the silicone resin, subsequently bringing the system back to room temperature while maintaining the pressure and then demolding. The usual time for the hot embossing process is between 5 min to a few hours and more typically between 1 to 3 hours. The applied force can vary widely but it is typically at or above 1 metric ton.

The stacking sequence is not important but the orientation is such that the feature on the master mold is facing the silicone resin substrate. Excellent replication fidelity of the mold feature is obtained by this technique. The feature remains unchanged on the silicone resin substrate as long as the substrate temperature remains below its glass transition.

Toughened thermoset silicone resins with a glass transition temperature moderately above room temperature and a relatively large elongation to failure are used as the substrate. The master mold is usually metallic in nature but can be made of any material having a softening point substantially higher than the Tg of the silicone resin. The master molds are illustrated by silicon wafers, silicon carbide, silicon nitride, aluminum, stainless steel, nickel, many alloys, and metal oxides.

Typical glass transition temperatures of toughened silicone thermoset resins usually range from just above room temperature to just above 100° C. depending on the composition, the type of crosslinker used in the formulation (applicable to addition cured resins) and the structure. Toughened silicone resin substrates suitable for use in the method of this invention are illustrated by addition cured silicone resins such as those disclosed in U.S. Pat. No. 6,368,535 which discloses curable silsesquioxane resin compositions obtained by a method comprising (1) copolymerizing a combination comprising components (A) and (B) wherein component (A) is a hydrolyzate of a hydrolysis precursor wherein the hydrolysis precursor comprises (i) organotrialkoxysilanes or organotrihalosilanes and (ii) a monofunctional silane selected from triorganomonoalkoxysilanes, triorganomonohalosilanes, disiloxanes, and disilazanes and component (3) is a silyl-terminated hydrocarbon having the formula:

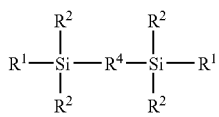

wherein each $R^1$ is independently selected from a halogen atom, a hydroxyl group, an alkoxy group, an oximo group, an alkyloximo group, an aryloximo group, an alkylcarboxyl group, and an arylcarboxyl group, each $R^2$ is independently selected from alkyl and aryl groups, and $R^4$ is a divalent hydrocarbon group. The hydrolysis precursor can further comprise (iii) a difunctional silane selected from diorganodihalosilanes and diorganodialkoxysilanes.

The hydrolysis precursor can further comprise (iii) a difunctional silane selected from the group consisting of diorganodihalosilanes and diorganodialkoxysilanes. Typically Component (i) is an organotrihalosilane selected from methyltrichlorosilane, phenyltrichlorosilane, or a combination thereof.

Compounds suitable for component (B) in the '535 patent are exemplified by:

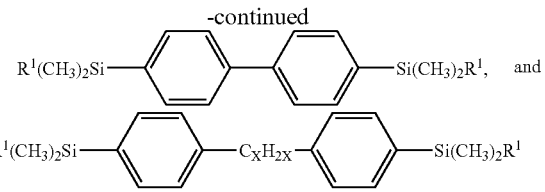

where $R^1$ is as defined above, and x is 1 to 6, preferably 1 to 4.

Compounds suitable for use as component (B) in the '535 patent are further exemplified by those shown below. These compounds are known in the art and are commercially available. For example, p-bis(hydroxydimethylsilyl)benzene, shown below, can be obtained from Gelest, Inc. of Tullytown, Pa. and p-bis(chlorodimethylsilyl-ethyl)benzene can be obtained from United Chemical Technologies, Inc.

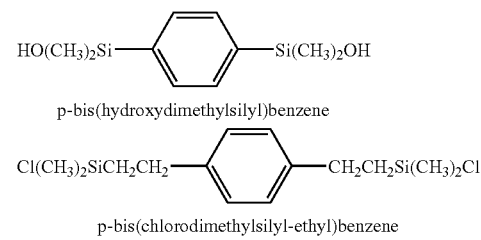

Component (A) can further comprise (C) a crosslinker selected from the group consisting of tetraethoxysilane, methyltriacetoxysilane, methyltrioximosilane, and tetraoximosilane.

The combination can further comprise (D) a weak condensation catalyst which is typically selected from metal esters of Group IVB metals and alkoxides of Group IVB metals.

The method can further comprises (2) heating the curable silsesquioxane resin composition for a time and to a temperature sufficient to cure the curable composition, thereby forming a cured silsesquioxane resin. The method can also further comprise adding a strong condensation reaction catalyst to the curable silsesquioxane resin composition prior to step (2). The strong condensation catalyst is typically selected from zinc octoate, choline octoate, sulfric acid, phosphoric acid, potassium hydroxide, cesium hydroxide, metal silanolates, and calcined lime. The amount of strong condensation catalyst in the composition is typically 0 to 2, preferably 0.05 to 0.4 weight %.

The method can further comprise adding one or more components selected from (E) a first silicone rubber having the empirical formula

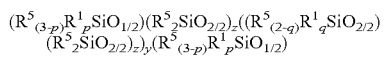

herein each $R^1$ is as described above, each and $R^5$ is independently selected from the nonfunctional $R^2$ groups, p is 1, 2 or 3, q is 1 or 2, x is an integer greater than or equal to 6, and y is zero or an integer up to 10, (F) a second silicone rubber, having the empirical formula

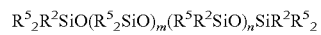

where $R^2$ is $R^1$ or $R^2$ as described above and each $R^5$ is as described above, with the proviso that at least two $R^2$ groups per molecule must be $R^1$, m is 150 to 1,000, and n is 0 to 10, and (G) a solvent wherein one or more of components (E), (F), and (G) is added to the curable silsesquioxane resin composition after step (1) and prior to step (2).

Component (E) is a first optional silicone rubber. The amount of component (E) in the curable composition is 0 to 30 weight %, preferably 5 to 20 weight %. Suitable silicone rubbers for component (E) and methods for their incorporation into a curable composition are disclosed in U.S. Pat. Nos. 5,747,608 and 5,830,950 The silicone rubber has the empirical formula:

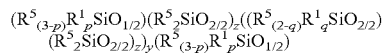

wherein each $R^1$ is as described above, p is 1, 2 or 3, q is 1 or 2, z is an integer greater than or equal to 6, and y is zero or an integer up to 10. Each $R^5$ group in component (E) is independently selected from the nonfunctional groups for $R^2$, described above. Each $R^1$ is a functional group which participates in the curing reaction to form the cured silsesquioxane of the present invention, as discussed above.

In the empirical formula, z represents the average nonfunctional linear chain length of the silicone rubber, i.e. the average chain length between $R^1$ groups. Hence, component (E) can be a mixture of silicone rubbers of various degrees of polymerization, all of which are represented by above empirical formula. Most silicone rubbers used in connection with the present invention have reactive groups only at the terminal groups of the chain. In such instances, the term "Degree of polymerization" ("DP") as used herein is the same as the value of z. DP does not include the terminal functional siloxy groups $R^1$.

In the preferred embodiment of the invention, the $R^5$ groups are methyl groups, phenyl groups, or a combination thereof. When a high percentage of the $R^2$ groups of component (A) the silsesquioxane precursor and the $R^5$ groups of (E) the first silicone rubber are either predominantly methyl or predominantly phenyl, (A) the silsesquioxane precursor and (E) the first silicone rubber are generally compatible, permitting the rubber to be dispersed throughout the cured silsesquioxane resin structure in a relatively homogeneous manner.

Component (F) is a second optional silicone rubber. This optional silicone rubber is a polydiorganosiloxane of the empirical formula $R^5_2R^2SiO(R^5_2SiO)_m R^5R^2SiO)_n SiR^2R^5_2$ wherein each $R^2$ and each $R^5$ are as described above, with the proviso that at least two $R^2$ groups per molecule must be $R^1$, m is 150 to 1,000, preferably 246 to 586, and n is 1 to 10. The amount of component (F) in the curable composition is generally 0 to 15 weight %, preferably 2 to 8 weight %.

Typically, the amount of Component (G), the solvent, is 0 to 90 weight %, preferably 0 to 50 weight % of the composition. Suitable solvents as (G) include alcohols such as methyl, ethyl, isopropyl, and t-butyl; aromatic hydrocarbons such as benzene, toluene, and xylene; aliphatic hydrocarbons such as heptane, hexane, and octane; glycol ethers such as propylene glycol methyl ether, dipropylene glycol, methyl ether, propylene glycol n-butyl ether, propylene glycol n-propyl ether, and ethylene glycol n-butyl ether; and halogenated hydrocarbons such as 1,1,1-trichloroethane and methylene chloride. Toluene and isopropyl alcohol are preferred.

Toughened silicone resin substrates also suitable for use in the method of this invention are illustrated by the addition cured silicone resins disclosed in U.S. Pat. No. 6,310,146 which discloses a hydrosilylation reaction curable composition comprising: (A') a silsesquioxane copolymer comprising units that have the empirical formula $R^1_a R^2_b R^3_c SiO_{(4-a-b-c)/2}$, wherein a is zero or a positive number, b is zero or a positive number, c is zero or a positive number, with the provisos that $0.8 \leq (a+b+c) \leq 3.0$ and component (A') has an average of at least two $R^1$ groups per molecule, each $R^1$ is a functional group independently selected from the group consisting of hydrogen atoms and monovalent hydrocarbon groups having aliphatic unsaturation, each $R^2$ is a monovalent hydrocarbon group selected from nonfunctional groups and $R^1$, each $R^3$ is a monovalent hydrocarbon group selected from nonfunctional groups and $R^1$; (B') a silyl-terminated hydrocarbon having the general formula

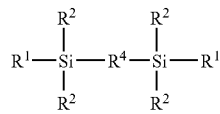

where $R^1$ and $R^2$ are as described above for component (A'), with the provisos that when $R^1$ in component (A) is a hydrogen atom, $R^1$ in component (B') is an unsaturated monovalent hydrocarbon group and when $R^1$ in component (A') is an unsaturated monovalent hydrocarbon group, $R^1$ in component (B') is a hydrogen atom, and $R^4$ is a divalent hydrocarbon group; and (C') a hydrosilylation reaction catalyst.

The compositions can further comprise one or more components selected from (D') a hydrosilylation reaction catalyst inhibitor, (E') a first silicone rubber having the empirical formula

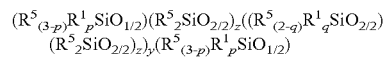

where each $R^1$ is as described above, each $R^5$ group in component (E') is independently selected from the nonfunctional groups for $R^2$, p is 1, 2 or 3, q is 1 or 2, z is an integer greater than or equal to 6, and y is zero or an integer up to 10, (F') 0 to 15 weight % of a second silicone rubber having the empirical formula $R^5_2R^6SiO(R^5_2SiO)_m(R^5R^6SiO)_n SiR^6R^5_2$, where each $R^5$ is as described above, each $R^6$ is selected from the group consisting of $R^1$ and $R^5$, with the proviso that at least two $R^6$ groups per molecule must be $R^1$, m is 150 to 1,000, and n is 1 to 10, and (G') a solvent.

Components (A') and (B') are typically added to the curable composition in amounts such that silicon bonded hydrogen atoms (SiH) and unsaturated hydrocarbon groups (C=C) in components (A') and (B') are present in the curable composition at a molar ratio (SiH:C=C) ranging from 1.0:1.0 to 1.5:1.0, and more typically from 1.1:1.0 to 1.5:1.0. The amounts of components (A') and (B') in the composition will depend on the number of C=C and Si—H groups per molecule. However, the amount of component (A') is typically 50 to 98 weight % of the composition, and the amount of component (B') is typically 2 to 50 weight % of the composition. Typically, $R^1$ is an alkenyl group such as vinyl or allyl. Typically, $R^2$ and $R^3$ are nonfunctional groups selected from the group consisting of alkyl and aryl groups. Suitable alkyl groups include such as methyl, ethyl, isopropyl, n-butyl, and isobutyl. Suitable aryl groups are exemplified by phenyl. Suitable silsesquioxane copolymers for component (A') are exemplified by $(PhSiO_{3/2})_{0.75}(ViMe_2SiO_{1/2})0.25$, where Ph is a phenyl group, Vi represents a vinyl group, and Me represents a methyl group.

Component (B') is typically selected from compounds having the formulae:

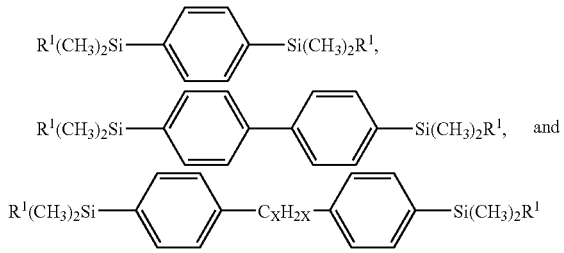

where $R^1$ is as defined above and x is an integer from 1 to 6. The most common compound used for component (B') is p-bis(dimethylsilyl)benzene.

Typically component (C') is a platinum catalyst and is typically added to the curable composition in an amount sufficient to provide 1 to 10 ppm of platinum by weight of the curable composition. Component (C') is exemplified by platinum catalysts such as chloroplatinic acid, alcohol solutions of chloroplatinic acid, dichlorobis(triphenylphosphine)platinum(II), platinum chloride, platinum oxide, complexes of platinum compounds with unsaturated organic compounds such as olefins, complexes of platinum compounds with organosiloxanes containing unsaturated hydrocarbon groups, such as Karstedt's catalyst (i.e. a complex of chloroplatinic acid with 1,3-divinyl-1,1,3,3-tetramethyldisiloxane) and 1,3-diethenyl-1,1,3,3-tetramethyldisiloxane, and complexes of platinum compounds with organosiloxanes, wherein the complexes are embedded in organosiloxane resins. Suitable hydrosilylation reaction catalysts are described in U.S. Pat. No. 3,419,593.

Component (D') is an optional catalyst inhibitor, typically added when a one part composition is prepared. Suitable inhibitors are disclosed in U.S. Pat. No. 3,445,420. Component (D') is preferably an acetylenic alcohol such as methylbutynol or ethynyl cyclohexanol. Component (D') is more preferably ethynyl cyclohexanol. Other examples of inhibitors include diethyl maleate, diethyl fumamate, bis(2-methoxy-1-methylethyl)maleate, 1-ethynyl-1-cyclohexanol, 3,5-dimethyl-1-hexyn-3-ol, 2-phenyl-3-butyn-2-ol, N,N,N',N'-tetramethylethylenediamine, ethylenediamine, diphenylphosphine, diphenylphosphite, trioctylphosphine, diethylphenylphosphonite, and methyldiphenylphosphinite.

Component (D') is present at 0 to 0.05 weight % of the hydrosilylation reaction curable composition. Component (D') typically represents 0.0001 to 0.05 weight % of the curable composition. Component (D') preferably represents 0.0005 to 0.01 weight percent of the total amount of the curable composition. Component (D') more preferably represents 0.001 to 0.004 weight percent of the total amount of the curable composition.

Component (E') is an optional silicone rubber. The amount of component (E') in the hydrosilylation reaction curable composition is 0 to 30 weight %, preferably 5 to 20 weight %. Suitable silicone rubbers for component (E') and methods for their incorporation into a curable composition are disclosed in U.S. Pat. Nos. 5,747,608 and 5,830,950. The silicone rubber has the empirical formula:

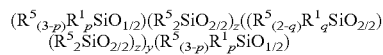

wherein each $R^1$ is as described above, p is 1, 2 or 3, q is 1 or 2, z is an integer greater than or equal to 6, and y is zero or an integer up to 10. Each $R^1$ is a functional group, which does participate, in the curing reaction to form the cured silsesquioxane of the present invention, as discussed above. Each $R^5$ group in component (E') is independently selected from the nonfunctional groups for $R^2$, described above.

In the empirical formula, z represents the average nonfunctional linear chain length of the silicone rubber, i.e. the average chain length between $R^1$ groups. Hence, component (E') can be a mixture of silicone rubbers of various degrees of polymerization, all of which are represented by above empirical formula. Most silicone rubbers used have $R^1$ groups only at the terminal groups of the chain. In such instances, the term "degree of polymerization" ("DP") as used herein is the same as the value of z. DP does not include the terminal functional siloxy groups.

In the preferred embodiment, the $R^5$ groups are methyl groups, phenyl groups, or a combination thereof. When a high percentage of the $R^2$ groups of component (A') the silsesquioxane copolymer and the $R^5$ groups of (E') the first silicone rubber are either predominantly methyl or predominantly phenyl, (A') the silsesquioxane copolymer and (E') the first silicone rubber are generally compatible, permitting the rubber to be dispersed throughout the cured silsesquioxane resin structure in a relatively homogeneous manner.

Component (F') the second optional silicone rubber is a polydiorganosiloxane of the empirical formula $R^5{}_2R^6SiO$ $(R^5{}_2SiO)_m(R^5R^6SiO)_nSiR^6R^5{}_2$ wherein each $R^5$ is as described above, each $R^6$ is selected from the group consisting of $R^1$ and $R^5$, with the proviso that at least two $R^6$ groups per molecule must be $R^1$, m is 150 to 1,000, preferably 246 to 586, and n is 1 to 10. The amount of component (F') in the curable composition is generally 0 to 15 weight %, preferably 2-8 weight %.

The hydrosilylation reaction curable composition comprising components (A'), (B'), and (C'), and any optional components can be dissolved in component (G'), an optional solvent. Typically, the amount of solvent is 0 to 90 weight %, preferably 0 to 50 weight % of the curable composition. The solvent can be an alcohol such as methyl, ethyl, isopropyl, and t-butyl alcohol; a ketone such as acetone, methylethyl ketone, and methyl isobutyl ketone; an aromatic hydrocarbon such as benzene, toluene, and xylene; an aliphatic hydrocarbon such as heptane, hexane, and octane; a glycol ether such as propylene glycol methyl ether, dipropylene glycol, methyl ether, propylene glycol n-butyl ether, propylene glycol n-propyl ether, and ethylene glycol n-butyl ether; a halogenated hydrocarbon such as dichloromethane, 1,1,1-trichloroethane and methylene chloride; chloroform; dimethyl sulfoxide; dimethyl formamide; acetonitrile and tetrahydrofuran. Toluene is preferred.

The hydrosilylation reaction curable composition described above is prepared by a method comprising mixing the composition comprising components (A') to (C') and any of the optional ingredients described above. Mixing can be carried out by any suitable means. The curable composition can be made either as a one part or as multiple part composition, such as a two part composition.

When the curable composition is formulated as a one part composition, the method for preparing the one part composition generally comprises: (I) premixing (C') the catalyst and (D') the inhibitor, thereby forming a complex, and (II) mixing the complex with components (A'), (B'), and any desired optional components (E') to (G').

In an alternative embodiment of the invention, a one part composition can be prepared by (i) premixing (C') the catalyst and (D') the inhibitor, thereby forming a complex, (ii) mixing components (A'), (B'), (E'), (F'), and (G'), (iii) removing (G')

the solvent from the product of step (ii) thereby forming a fluid low viscosity composition, and thereafter (iv) mixing the complex with the product of step (iii).

A two part composition can be prepared by (1) preparing a first part comprising component (A'), and (2) preparing a second part comprising component (B), wherein component (C') is mixed with either the first or second part, and thereafter keeping the first and second parts separate. The first and second parts are mixed immediately before use.

Preferably, the two part composition is prepared by (1') mixing components (A'), (E'), (F') and (G') to form a first part, (2') mixing component (C') with a part selected from the group consisting of the first part and a second part comprising component (B'). The first and second parts are thereafter kept separate until mixing immediately before use.

Each of the above methods may further comprise the step of degassing the composition before curing. Degassing is typically carried out by subjecting the composition to a mild vacuum.

A cured silsesquioxane resin is prepared by a method comprising heating the hydrosilylation reaction curable composition described above at a temperature for a time sufficient to cure the hydrosilylation reaction curable composition. The curable composition may be degassed before curing, and any solvent may be removed before or during curing. The solvent may be removed by any convenient means such as by exposing the curable composition to mild heat or vacuum.

Toughened silicone resin substrates suitable for use in the method of this invention are also illustrated in PCT Patent Application No. JP03/07154 which discloses a polysiloxane film comprising a silicone resin obtained by a method comprising reacting (A") a silicone resin represented by the average formula $R^1_a SiO_{(4-a)/2}$ wherein $R^1$ is independently a monovalent hydrocarbon radical having from 1 to 10 carbon atoms, and a is integer of from 0 to 2 (both exclusive)) and having at least two unsaturated aliphatic hydrocarbon radicals in its molecule, (B") an organosilicon compound having at least two silicon-bonded hydrogen atoms in its molecule, in the presence of (C") a platinum catalyst. Component (A") is typically a silicone resin comprising units $(R^1_3SiO_{1/2})_a$ (i)

$(R^2_2SiO_{2/2})_b$ (ii)

$(R^3SiO_{3/2})_c$ (iii) and $(SiO_{4/2})_d$ (iv)

wherein $R^1$ and $R^2$ are each independently selected from monovalent hydrocarbon radicals having from 1 to 10 carbon atoms and unsaturated aliphatic hydrocarbon radicals, $R^3$ is an alkyl group having from 1 to 8 carbon atoms or an aryl group, a has a value of zero or greater than zero, b has a value of zero or greater than zero, c has a value of zero or greater than zero, d has a value of zero or greater than zero, with the provisos that the value of c+d is greater than zero, the value of a+b+c+d=1, and that are at least two silicon-bonded unsaturated aliphatic hydrocarbon atoms present in the silicone resin. Component (A") is illustrated by a silicone resin comprising the units $(ViMe_2SiO_{1/2})_{0.25}$ and $(PhSiO_{3/2})_{0.75}$, where Vi represents a vinyl group, Ph is a phenyl group, and Me represents a methyl group.

Component (B") is illustrated by p-bis(dimethylsilyl)benzene. Typically component (C") is a platinum catalyst and is typically added to the curable composition in an amount sufficient to provide 1 to 10 ppm of platinum by weight of the curable composition. Component (C") is exemplified by platinum catalysts such as chloroplatinic acid, alcohol solutions of chloroplatinic acid, dichlorobis(triphenylphosphine)platinum(II), platinum chloride, platinum oxide, complexes of platinum compounds with unsaturated organic compounds such as olefins, complexes of platinum compounds with organosiloxanes containing unsaturated hydrocarbon groups, such as Karstedt's catalyst (i.e. a complex of chloroplatinic acid with 1,3-divinyl-1,1,3,3-tetramethyldisiloxane) and 1,3-diethenyl-1,1,3,3-tetramethyldisiloxane, and complexes of platinum compounds with organosiloxanes, wherein the complexes are embedded in organosiloxane resins. Suitable hydrosilylation reaction catalysts are described in U.S. Pat. No. 3,419,593.

The current invention deals with the embossing of these substrates as freestanding films or as thicker plaques. These substrates have the additional benefit of extremely smooth surfaces (they are self planarized), which greatly improves the transfer of patterns with very high fidelity. Surface average roughness as low as 10 Å (RMS value by AFM) is readily observed in toughened silicone resin films. Common organic thermoplastic substrates such as freestanding films or plaques of PET or polycarbonate exhibit much rougher surface (typical RMS values in the order of tens of angstroms).

In current embossing processes it is also essential for either the substrate or more commonly the master mold to be surface-treated with a release agent in order to facilitate the separation of the substrate from the master mold after the pattern transfer. The most common release agents are silicone polymers or fluoro-polymers including fluorosilicones. In the absence of these release coatings, hot embossing is unsuccessful due to distortions (deformations) of the replica patterns induced by the adhesion forces between the master and the polymeric substrate during demolding.

Cured silicone resin thermoset substrates offer advantages over the organic thermoplastics in terms of hot embossing lithography by offering a very smooth surface which promotes high fidelity of replication in the micrometer and nanometer domain, and requiring no release agent for demolding.

DRAWINGS

EXAMPLES

Example 1

Figure 1:
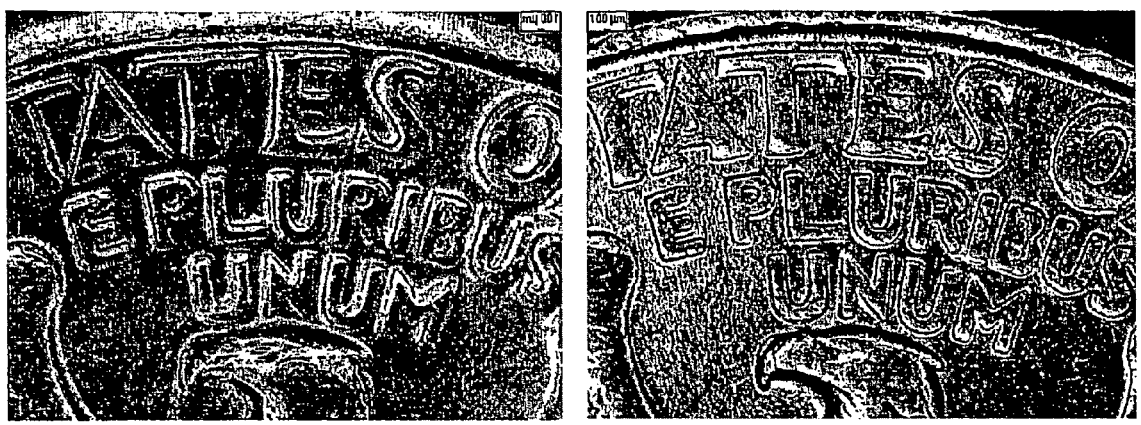
FIG. 1 is an optical image (10 times magnification) of the embossed silicone resin film of Example 1 (left) and of a US quarter coin (right). The embossed image was rotated left to right for comparison (see inverted 100 nm bar at the upper right corner).

Into a three neck round bottomed flask equipped with a stirrer, addition funnel, thermometer, and Dean Stark trap was charged with 17 g $(ViMe_2Si)_2O$, 107 g $PhSi(OMe)_3$, 1 g $H_2O$, and 0.1 g trifluromethane sulfonic acid. The mixture was heated at 60° C. for 2 hours. 22.2 g more $H_2O$ and 27.2 g toluene were added and the mixture was stirred at 50° C. for 2 hours. The temperature was then raised to maintain a good reflux and methanol was taken out from the bottom of the condenser. When the temperature reached 80° C. the flask was cooled to 40° C. 0.23 g $CaCO_3$ was added and stirred without heating for 24 hours. After this 18 g toluene and 0.1 g KOH were added. The temperature was raised to reflux and condensed water was taken out from the bottom of the condenser until there is no water coming out. The bodied resin was cooled to room temperature and 0.18 g ViMe$_2$SiCl was stirred in. The resin solution was finally filtered and additional toluene might be added to adjust the solid content to 75 wt. %. The resulting product was a silicone resin comprising the units (PhSiO$_{3/2}$)$_{0.75}$ and (ViMe$_2$SiO$_{1/2}$)$_{0.25}$.

Into a 5 L three necked, round bottomed flask equipped with a stirrer, a condenser, two addition funnels, a thermometer, heated with a heating mantle and purged with dry nitrogen, was charged with 84 g of Mg and 406 g THF. 10 g BrCH$_2$CH$_2$Br was added to activate Mg. In one of the addition funnel was added the solution of 270 g dibromobenzene in 526 g THF, and in another addition funnel 400 g THF. The flask was heated to 50 to 60° C., then 200 ml THF was added and the dibromobenzene solution was added slowly. A good reflux was maintained during this step. After this step 500 ml THF was added and the flask was heated at 65° C. for 5 hours, after the flask was cooled 500 ml more THF was added and 440 g dimethylchlorosilane was added slowly while the flask was cooled by an ice water bath. The addition of chlorosilane was adjusted so that a good reflux was maintained. After the addition of chlorosilane the flask was heated at 60° C. overnight. Then the flask was cooled to room temperature and 1000 ml of toluene was added. Saturated NH$_4$Cl water solution was added slowly to hydrolyze and condense the excess chlorosilane and the mixture was then washed with a large amount of water until a clear bottom phase was obtained. The top organic phase was collected and dried with magnesium sulfate and most of the solvent was removed by distillation until a temperature of 150° C. in the flask was reached. The concentrated crude product was further purified by vacuum distillation. GC purity of the product was 97%, and FT-IR, $^{29}$Si, $^{13}$C and $^1$H NMR were used to verify the structure. The resulting product was a compound having the structure 1,4-HMe$_2$Si-Ph-SiMe$_2$H (p-bis(dimethylsilyl)benzene).

A silicone resin thermoset substrate was prepared by mixing the silicone resin comprising the units (PhSiO$_{3/2}$)$_{0.75}$ and (ViMe$_2$SiO$_{1/2}$)$_{0.25}$ with 1,4-HMe$_2$Si-Ph-SiMe$_2$H so the SiH/SiVi ratio is 1.1/1, and the solvent toluene was removed by heating under a vacuum of 10 mmHg at 80° C. The residual toluene in the mixture was less than 1 wt. %. This mixture was then cast onto a polyethylene sheet and cured at 150° C. for 2 hours. The mixture was catalyzed with 5 ppm of Pt. The cured film was peeled off from the PE substrate in warm water and cooled. According to dynamic mechanical analysis, the film has a Tg between 75 and 90° C., depending on the experimental conditions.

The cured film was placed on a flat, smooth stainless steel plate, and a US Quarter was placed on top of the film. The plate, film, and coin were put in a hot press at a temperature of 80° C. and a force of 2 metric tons was applied for 120 minutes. Then the stack was cooled in the press with the pressure on. After cooling, the resin film was clearly embossed by the coin, as seen in FIG. 1.

Example 2

Figure 2:
FIG. 2 is an optical image of the embossed silicone resin film of Example 1 (left) and of a pattern wafer (right).
Figure 2:
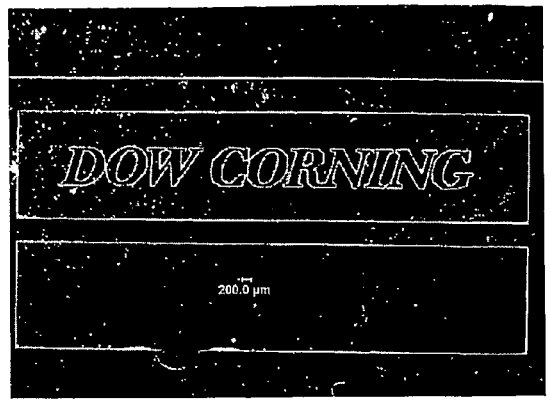

The cured siloxane film of Example 1 cut into a dimension of 100 mm×80 mm was placed on a patterned silicon wafer, 2 inches in diameter, and then was sandwiched between two stainless steel plates (230 mm×230 mm). The system was placed in a hot press, heated at 100° C. for 2 hours under a constant force of 5 metric tons. According to dynamic mechanical analysis, the film has a Tg between 80 and 95° C., depending on the experimental conditions. Thus the film was above its Tg during embossing. The system was allowed to cool under pressure. Optical microscopy showed that the wafer pattern was embossed into the silicone resin film as seen in FIG. 2.

The invention claimed is:

1. A method of embossing a cured silicone resin thermoset substrate to imprint patterns onto the substrate from a master mold comprising:
    (i) stacking a master mold with a cured silicone resin thermoset substrate such that a surface of the master mold containing a feature is facing the silicone resin substrate;
    (ii) applying a pressure to a product of (i) in a press at a temperature slightly higher than the Tg of the silicone resin but lower than a softening point of the master mold;
    (iii) cooling the product of (ii) and maintaining the pressure on the mold; and
    (iv) releasing the substrate whereby a feature is imprinted on the silicone resin substrate.

2. A method according to claim 1, wherein the substrate is in the form of a film, plaque, or coating.

3. A method according to claim 1, wherein the toughened silicone resin thermoset substrates have a glass transition temperatures from 50° C. to 120° C.

4. A method according to claim 1, wherein the pressure is at or above 1 metric ton.

5. A method according to claim 1, wherein the master mold is selected from silicon wafers, silicon carbide, silicon nitride, aluminum, stainless steel, nickel, alloys, and metal oxides.

6. A method according to claim 1, wherein the cured silicone resin thermoset substrate is a composition obtained by a method comprising (1) copolymerizing a combination comprising components (A) and (B) wherein component (A) is a hydrolyzate of a hydrolysis precursor wherein the hydrolysis precursor comprises (i) organotrialkoxysilanes or organotrihalosilanes and (ii) a monofunctional silane selected from triorganomonoalkoxysilanes, triorganomonohalosilanes, disiloxanes, and disilazanes and component (B) is a silyl-terminated hydrocarbon having the formula:

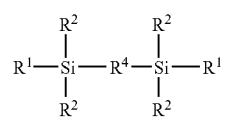

wherein each R$^1$ is independently selected from a halogen atom, a hydroxyl group, an alkoxy group, an oximo group, an alkyloximo group, an aryloximo group, an alkylcarboxyl group, and an arylcarboxyl group, each R$^2$ is independently selected from alkyl and aryl groups, and R$^4$ is a divalent hydrocarbon group.

7. A method according to claim 1, wherein the cured silicone resin thermoset substrate is a composition comprising: (A') a silsesquioxane copolymer comprising units that have the empirical formula R$^1_a$R$^2_b$R$^3_c$SiO$_{(4-a-b-c)/2}$ wherein a is zero or a positive number, b is zero or a positive number, c is zero or a positive number, with the provisos that $0.8 \leq (a+b+c) \leq 3.0$ and component (A') has an average of at least two R$^1$ groups per molecule, each R$^1$ is a functional group independently selected from the group consisting of hydrogen atoms and monovalent hydrocarbon groups having aliphatic unsaturation, each R$^2$ is a monovalent hydrocarbon group selected from nonfunctional groups and R$^1$, each R$^3$ is a monovalent hydrocarbon group selected from nonfunctional groups and R$^1$; (B') a silyl-terminated hydrocarbon having the general formula

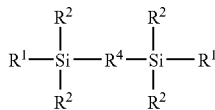

where $R^1$ and $R^2$ are as described above for component (A'), with the provisos that when $R^1$ in component (A') is a hydrogen atom, $R^1$ in component (B') is an unsaturated monovalent hydrocarbon group and when $R^1$ in component (A') is an unsaturated monovalent hydrocarbon group, $R^1$ in component (B') is a hydrogen atom, and $R^4$ is a divalent hydrocarbon group; and (C') a hydrosilylation reaction catalyst.

8. A method according to claim 1, wherein the cured silicone resin thermoset substrate is a polysiloxane film comprising a silicone resin obtained by a method comprising reacting (A'') a silicone resin represented by the average formula $R^1_a SiO_{(4-a)/2}$ wherein $R^1$ is independently a monovalent hydrocarbon radical having from 1 to 10 carbon atoms, and a is integer of from 0 to 2 (both exclusive)) and having at least two unsaturated aliphatic hydrocarbon radicals in its molecule, (B'') an organosilicon compound having at least two silicon-bonded hydrogen atoms in its molecule, in the presence of (C'') a platinum catalyst.

9. A method according to claim 8, wherein Component (A'') is a silicone resin comprising units $(R^1_3 SiO_{1/2})_a$           (i)

$(R^2_2 SiO_{2/2})_b$           (ii)

$(R^3 SiO_{3/2})_c$           (iii) and $(SiO_{4/2})_d$           (iv)

wherein $R^1$ and $R^2$ are each independently selected from monovalent hydrocarbon radicals having from 1 to 10 carbon atoms and unsaturated aliphatic hydrocarbon radicals, $R^3$ is an alkyl group having from 1 to 8 carbon atoms or an aryl group, a has a value of zero or greater than zero, b has a value of zero or greater than zero, c has a value of zero or greater than zero, d has a value of zero or greater than zero, with the provisos that the value of c+d is greater than zero, the value of a+b+c+d=1, and that are at least two silicon-bonded unsaturated aliphatic hydrocarbon atoms present in the silicone resin.

10. A method according to claim 8 wherein Component (B'') is p-bis(dimethylsilyl)benzene.

11. A method according to claim 3, wherein the pressure is at or above 1 metric ton.

12. A method according to claim 11, wherein the master mold is selected from silicon wafers, silicon carbide, silicon nitride, aluminum, stainless steel, nickel, alloys, and metal oxides.

13. A method according to claim 12, wherein the cured silicone resin thermoset substrate is a composition obtained by a method comprising (1) copolymerizing a combination comprising components (A) and (B) wherein component (A) is a hydrolyzate of a hydrolysis precursor wherein the hydrolysis precursor comprises (i) organotrialkoxysilanes or organotrihalosilanes and (ii) a monofunctional silane selected from triorganomonoalkoxysilanes, triorganomonohalosilanes, disiloxanes, and disilazanes and component (B) is a silyl-terminated hydrocarbon having the formula:

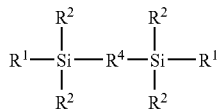

wherein each $R^1$ is independently selected from a halogen atom, a hydroxyl group, an alkoxy group, an oximo group, an alkyloximo group, an aryloximo group, an alkylcarboxyl group, and an arylcarboxyl group, each $R^2$ is independently selected from alkyl and aryl groups, and $R^4$ is a divalent hydrocarbon group.

14. A method according to claim 12, wherein the cured silicone resin thermoset substrate is a composition comprising: (A') a silsesquioxane copolymer comprising units that have the empirical formula $R^1_a R^2_b R^3_c SiO_{(4-a-b-c)/2}$, wherein a is zero or a positive number, b is zero or a positive number, c is zero or a positive number, with the provisos that $0.8 \leq (a+b+c) \leq 3.0$ and component (A') has an average of at least two $R^1$ groups per molecule, each $R^1$ is a functional group independently selected from the group consisting of hydrogen atoms and monovalent hydrocarbon groups having aliphatic unsaturation, each $R^2$ is a monovalent hydrocarbon group selected from nonfunctional groups and $R^1$, each $R^3$ is a monovalent hydrocarbon group selected from nonfunctional groups and $R^1$; (B') a silyl-terminated hydrocarbon having the general formula

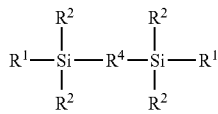

where $R^1$ and $R^2$ are as described above for component (A'), with the provisos that when $R^1$ in component (A') is a hydrogen atom, $R^1$ in component (B') is an unsaturated monovalent hydrocarbon group and when $R^1$ in component (A') is an unsaturated monovalent hydrocarbon group, $R^1$ in component (B') is a hydrogen atom, and $R^4$ is a divalent hydrocarbon group; and (C') a hydrosilylation reaction catalyst.

15. A method according to claim 12, wherein the cured silicone resin thermoset substrate is a polysiloxane film comprising a silicone resin obtained by a method comprising reacting (A'') a silicone resin represented by the average formula $R^1_a SiO_{(4-a)/2}$ wherein $R^1$ is independently a monovalent hydrocarbon radical having from 1 to 10 carbon atoms, and a is integer of from 0 to 2 (both exclusive)) and having at least two unsaturated aliphatic hydrocarbon radicals in its molecule, (B'') an organosilicon compound having at least two silicon-bonded hydrogen atoms in its molecule, in the presence of (C'') a platinum catalyst.

16. A method according to claim 15 wherein Component (B'') is p-bis(dimethylsilyl)benzene.

* * * * *